J. PULLINGER.
AUGER ATTACHMENT FOR FLOUR PACKERS.
APPLICATION FILED SEPT. 28, 1908.
912,410.
Patented Feb. 16, 1909.
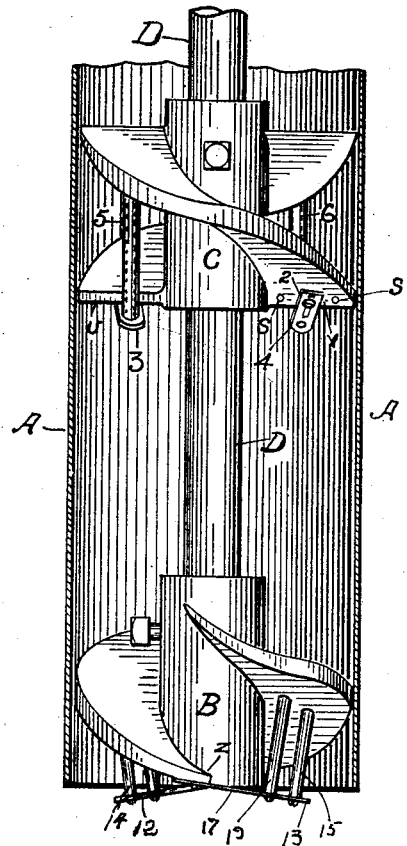
Fig. 1
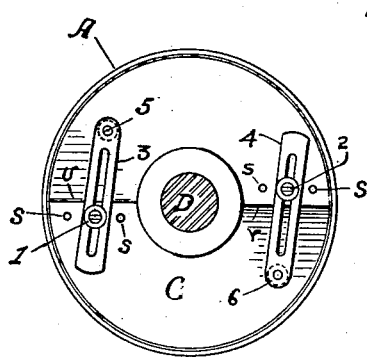
Fig. 2.
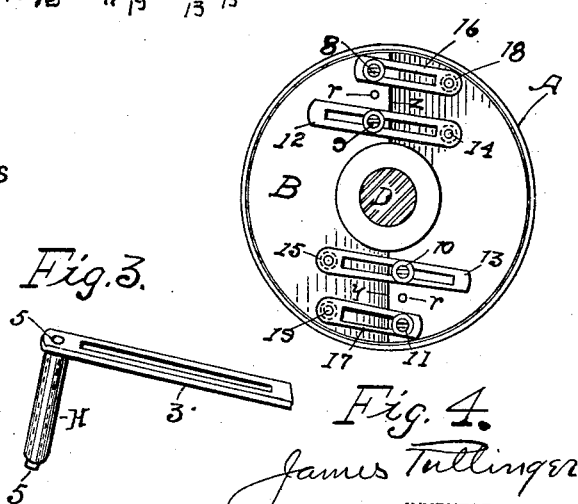
Fig. 3.
Fig. 4.
WITNESSES:
James Pullinger,
INVENTOR
BY Robert N. Randle
ATTORNEY.

UNITED STATES PATENT OFFICE.

JAMES PULLINGER, OF RICHMOND, INDIANA, ASSIGNOR TO THE CHATFIELD & WOODS SACK CO., OF CINCINNATI, OHIO, A CORPORATION.

AUGER ATTACHMENT FOR FLOUR-PACKERS.

No. 912,410.          Specification of Letters Patent.          Patented Feb. 16, 1909.

Application filed September 28, 1908. Serial No. 455,093.

*To all whom it may concern:*

Be it known that I, JAMES PULLINGER, a citizen of the United States, residing in the city of Richmond, in the county of Wayne, in the State of Indiana, have invented a new and useful Auger Attachment for Flour-Packers, of which the following is a full, clear, and comprehensive exposition and specification, being such as will enable others to make and use the same with absolute exactitude.

In flouring-mills it is now common to employ a machine which is termed a "flour packer", the essential feature of which, as relates to this invention, is a vertically disposed spout, which is round in cross-section, through which the finished product passes downward into the sacks. The open mouth of the sack is drawn up around the lower portion of the spout. Located in said spout are one or more augers, or screw feeds, whose diameter is, substantially equal to, or slightly less, than the inside diameter of the spout and in which it has a constant rotation to feed and force the flour into the sack to the desired density. The most serious objection to these flour packing machines has been that the sacks adhere and stick to the spout, and then when it is desired to remove the sack it is necessary to resort to various delaying expedients which have been very unsatisfactory and which have eventuated in great loss of time on the part of the operator.

To overcome the objection above stated is the primal object of my present invention, and this has been attained by means of the devices herein shown and described.

Another object of my invention, broadly stated, is to provide an attachment for augers of flour packing machines which will be positive in action, strong and durable in construction, easily attached and adjusted, and which can be sold at a comparatively low price.

Other objects and particular advantages of my invention will suggest themselves in the course of the following description.

One manner for the accomplishment of my invention, and that which in practice has been found to be the most practical, is shown in the accompanying drawings, in which—

Figure 1 is a side elevation of the several parts in operative position, showing the spout in section. Fig. 2 is a view of the lower end of the upper auger, showing my attachments in adjusted position. Fig. 3 is an isometrical view of one of my attachments. Fig. 4 is a view of the lower end of the lower auger, showing the positions of my attachments.

Similar indices denote like parts throughout the several views.

A denotes the spout having a lower open end. The upper portion of the spout merges into the source of supply for the flour.

B denotes the lower auger, and C denotes the upper auger, the two augers being alike.

D denotes a vertically disposed shaft which extends down centrally through the spout A, its upper end being geared to the source of power whereby it may have a constant rotation, its lower end being even with the lower end of the spout. Each of the augers is provided with an integral hub, through which said shaft extends. Set screws or the like are provided to extend into the hubs to secure the augers to the shaft.

The above is the ordinary construction employed, and the mouth of the sacks to be filled are placed around the spout and the flour is forced into the sacks by the augers and by gravity.

It should be noticed that the augers terminate at their lower ends each in two oppositely disposed lips $u$—$v$, and $y$—$z$ respectively, thereby forming a discharge mouth on each side of the hub of each auger.

My invention, as it relates to the upper auger, comprises two devices of like construction, one being attached to the underside of each of the lips $u$ and $v$, as by the screws 1 and 2 respectively. Each of said devices consists of an elongated plate 3, and 4, each having a slot therethrough formed longitudinally thereof for the respective screws 1 and 2 and by which said plates are adjustably secured as shown, or otherwise. Extending upwards at right-angles from the outer end portion of said plates are stems 5, and 6, respectively, which extend centrally across the mouths of the auger as indicated in Fig. 1. Each of the stems 5 and 6 should be covered with a rubber tube H or the like as is indicated in Fig. 3.

The letters $s$, Figs. 1 and 2, denotes threaded apertures which are the same as those occupied by the screws 1 and 2, by means of which the position of the devices may be changed laterally. Near the lips y and z of the lower auger are also formed threaded apertures r, three on each side of the hub, for the screws 8—9 and 10—11.

On the lower auger I may employ four of my devices, as shown in Fig. 4.

The two inner devices of the lower auger comprise an elongated plate 12, and 13, each having a slot therethrough formed longitudinally thereof for the respective screws 9 and 10, and by which said plates are adjustably secured as shown. Extending upwards at right angles from the outer end portion of said plates 12 and 13 are stems 14, and 15, respectively, which extend across the mouths of the auger B as indicated. Also the two outer devices, of the lower auger, comprise each a shorter plate 16, and 17, each having a slot formed therethrough longitudinally thereof for the respective screws 8 and 11, by which said plates are adjustably securable as shown. Extending upwards at right angles from the outer end portions of said plates 16, and 17, are stems 18, and 19, respectively, which extend across the mouths of the auger B. Each of the stems 18, 14, 15 and 19, should be covered with a rubber tube H substantially the same as that shown in Fig. 3.

By reason of the slots in the several plates I am enabled to adjust each of the devices as desired, by means of the screws which hold them in place.

By the above it will be observed that the six attachments which I employ in this instance are almost identical with each other in construction, the only difference being that the plates of two of the lower devices are shorter than the others, and this is only for the purpose of adapting them to the contour of the augers.

In practice the two upper attachments are retained in the position substantially as shown; and when desired for rapid or medium packing the devices on the lower auger are arranged substantially as shown. But in the event of slower packing being desired it is preferable to remove the two outer devices from auger B and to change the two inner devices outward, that is,—securing them by the screws 9 and 10 in the center holes r in place of that shown in the drawings.

By means of my devices the flour is not released until it reaches the lower end of the spout, therefore when the packer is stopped there will no flour fall on the floor or platform, and there will no additional flour fall into the sack from the spout.

I have found by actual practice that my invention fully overcomes the objections previously, herein, referred to,—that is to say, I provide means for preventing the sacks from adhering or sticking to the spout during the process of filling the sacks. The reason the sacks do not stick to the spout when my invention is employed is that the column or body of flour as it leaves the spout is broken up and falls lightly into the sack and is equally distributed therein, whereas without the employment of my invention the flour falls into the sack in one, or two, columns which striking the loose flour, first deposited in the sack, causes the flour to dash upward and, impelled by the constant inrush of flour, it packs in the space between the spout and the mouth of the sack with such density as to cause the sack to adhere to the spout as herein before stated. The above applies to the time after which a small quantity of flour has been deposited in the sack up to the time when the sack is almost full, after which the auger continuing to operate will pack the flour in the sack to the required density. It of course should be understood that the greatest trouble, heretofore referred to, occurs just after some flour has fallen to the bottom of the sack.

It should be understood that various changes may be made in the details of construction without departing from the spirit of my invention or sacrificing any of the advantages thereof.

Having now fully shown and described my invention and one manner for its construction and operation, what I claim and desire to secure by Letters Patent of the United States, is.

1. In combination with a flour-packer auger, an elongated plate having a slot formed therethrough longitudinally thereof, a stem rigidly connected to one end portion of the plate and disposed at substantially right angles thereto, substantially as described and for the purposes set forth.

2. In combination with a flour-packer auger, an elongated plate, a stem connected to one end portion of the plate and located at substantially right angles thereto, and means for adjustably securing the plate, all substantially as set forth and for the purposes specified.

3. Attachments for augers of flour packing machines, each attachment comprising a plate, a stem rigidly attached to said plate and adapted to project across the mouth of the auger, and means whereby the device may be adjustably secured in position.

4. In combination with the auger of flour packing machines, devices extending across the mouths of the auger, each comprising a stem, means whereby the stem may be adjusted and retained in operative position.

5. Auger attachments for flour packing machines, each comprising a plate having a slot formed longitudinally thereof, a stem extending up from the outer end of the plate, and adjustable means for securing the attachments in position.

6. Auger attachments for flour packing machines, each of the attachments comprising a plate, a stem extending upward from the outer end of the plate, a covering for the stem, and means for adjustably securing the attachments to the auger.

7. In combination with a flour-packer auger, an elongated plate having means for adjustably securing it in position, a stem attached to said plate and extending at right-angles thereto, and a resilient covering for said stem.

8. In combination with a flour-packer auger, a stem disposed across each mouth of the auger, and means for adjustably securing the stem in position.

9. In combination with a flour-packer auger revolubly mounted in a spout, means carried by the auger for dividing up the columns of flour as they leave the spout, whereby the flour will be evenly distributed in the sack which depends below and from around the spout and means whereby the first named means may be adjusted and removed.

10. In combination with flour packing machines having a spout to be inserted in sacks to receive the flour therefrom, and an auger operating in said spout, means carried by the auger for dividing up the body of flour as it issues from the spout in order that the flour may be deposited evenly in the sack and preventing it from accumulating between the sack and the spout.

In testimony whereof I have hereunto subscribed my name in the presence of two subscribing witnesses.

JAMES PULLINGER.

Witnesses:
R. W. RANDLE,
R. E. RANDLE.